No. 649,096. Patented May 8, 1900.
R. D. ALLNUTT.
ATTACHMENT FOR CORN PLANTERS.
(Application filed Feb. 6, 1900.)
(No Model.) 3 Sheets—Sheet 1.
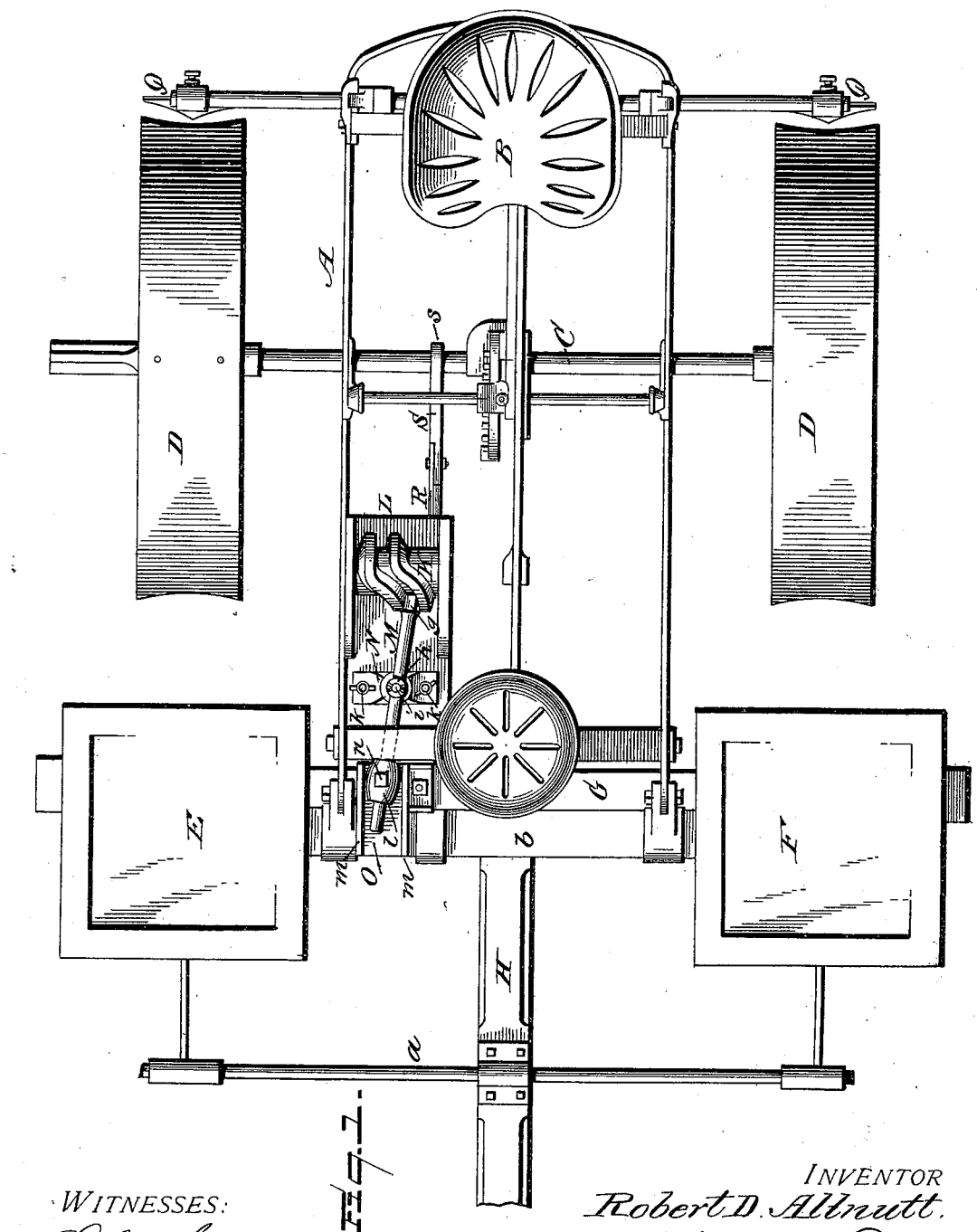
WITNESSES:
L. C. Hills.
W. R. Taylor.
INVENTOR
Robert D. Allnutt.
BY Chas. H. Fowler.
Attorney No. 649,096. Patented May 8, 1900.
R. D. ALLNUTT.
ATTACHMENT FOR CORN PLANTERS.
(Application filed Feb. 6, 1900.)
(No Model.) 3 Sheets—Sheet 2.
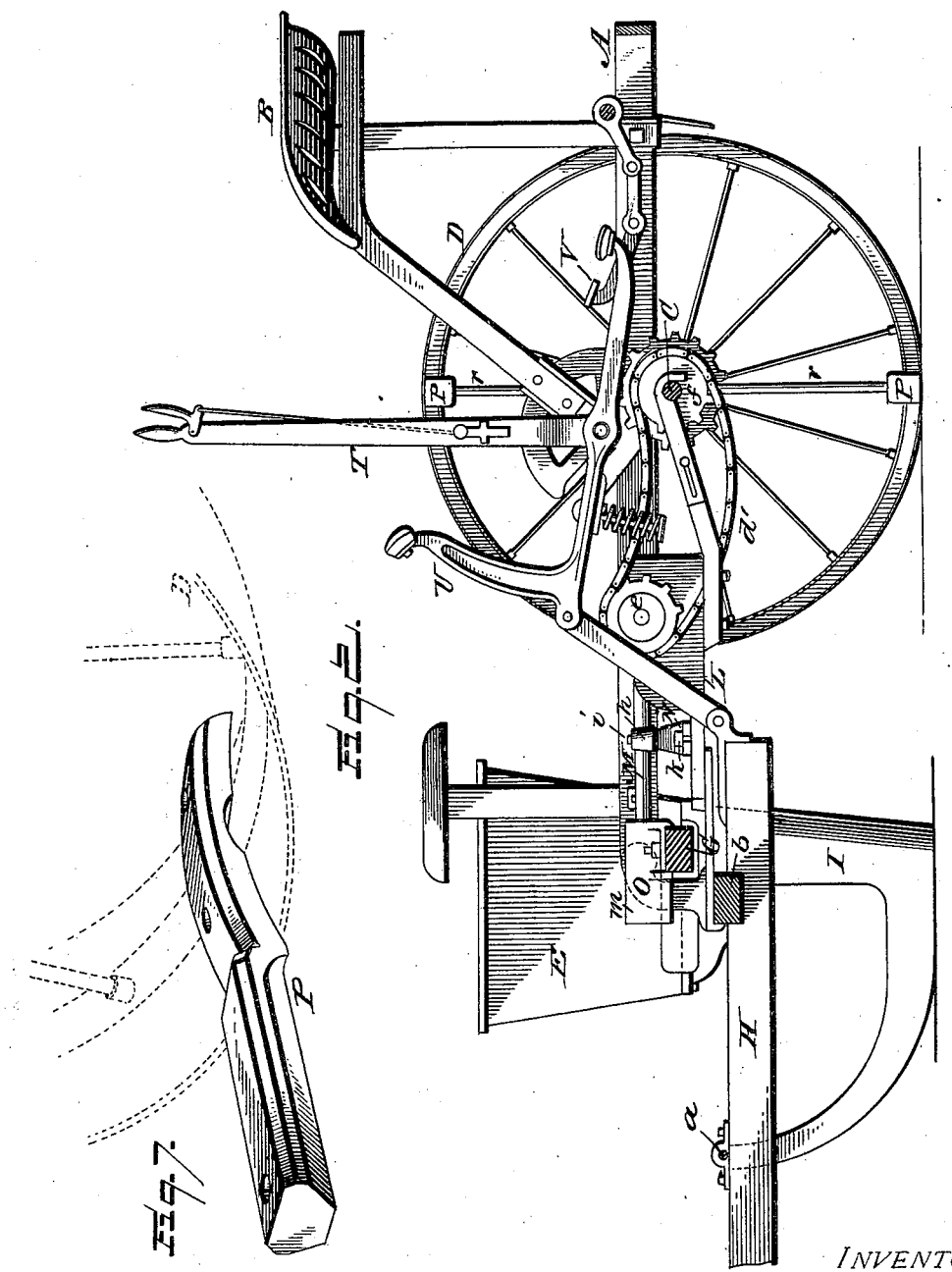
WITNESSES:
L. C. Hills.
M. R. Taylor.
INVENTOR
Robert D. Allnutt.
BY Chas. H. Fowler
Attorney

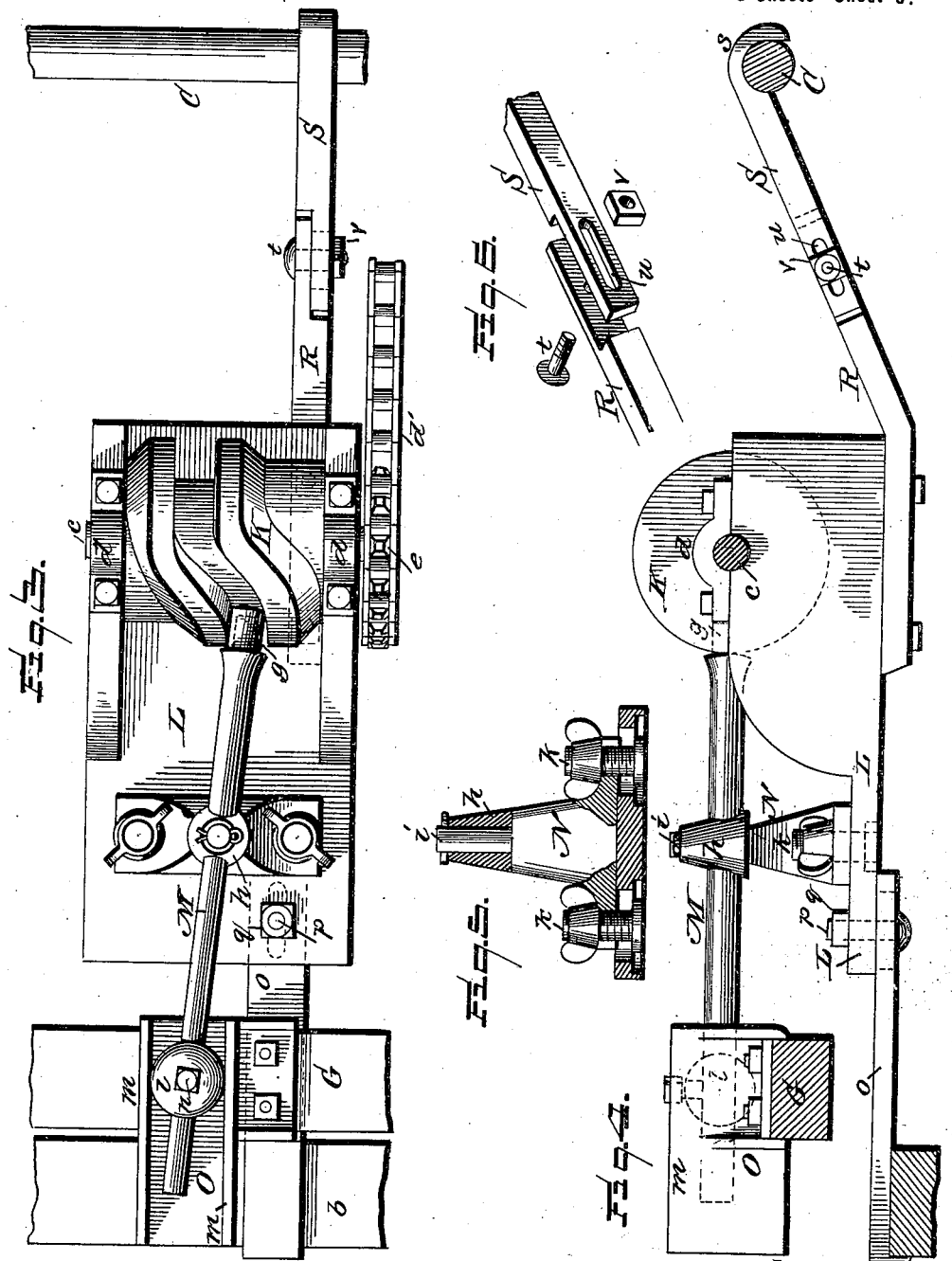

UNITED STATES PATENT OFFICE.

ROBERT D. ALLNUTT, OF CHILLICOTHE, MISSOURI.

ATTACHMENT FOR CORN-PLANTERS.

SPECIFICATION forming part of Letters Patent No. 649,096, dated May 8, 1900.

Application filed February 6, 1900. Serial No. 4,176. (No model.)

*To all whom it may concern:*

Be it known that I, ROBERT D. ALLNUTT, a citizen of the United States, residing at Chillicothe, in the county of Livingston and State of Missouri, have invented certain new and useful Improvements in Attachments for Corn-Planters; and I do hereby declare that the following is a full, clear, and exact description of the same, reference being had to the annexed drawings, making a part of this specification, and to the letters of reference marked thereon.

The present invention has for its object to provide a simple, practical, and easily-operating attachment to corn-planters whereby the corn is automatically dropped without the employment of the usual check-rower; and the invention consists in a corn-dropping attachment constructed substantially as shown in the drawings and hereinafter described and claimed.

Figure 1 of the drawings is a top plan view of a corn-planter, showing my corn-dropping attachment applied thereto, the sprocket chain and wheels and other parts of the planter which have no special bearing with my invention being left off; Fig. 2, a side elevation of a corn-planter, partly in section, showing my corn-dropping attachment applied thereto; Fig. 3, a top plan view of my improved corn-dropping attachment; Fig. 4, a side elevation thereof, partly in section; Fig. 5, a detail sectional view showing the bracket and the sleeve of the lever which is operated by the grooved cam connected thereto; Fig. 6, a detail perspective view of the inner ends of the two sections forming the extensible brace-bar, showing them separated. Fig. 7 is a perspective view of one of the markers, showing it in position with relation to the wheels, the latter being indicated in dotted lines.

In the accompanying drawings, A represents the usual frame of a corn-planter, which is provided with the driver's seat B and the rotatable axle C, upon the ends of which axle are secured the wheels D, of any preferred construction.

The frame A, at its front, has the usual corn-hoppers E F and the usual dropping-slide G, which slide may be of the usual contruction or of any well-known form and operated, in connection with the hoppers, to drop the corn in the usual manner. The hoppers E F are connected by a transverse brace $b$, and a brace-rod $a$ connects the hoppers with the usual tongue H, and I represents the usual runners or furrow-openers.

I do not wish to be understood as limiting my invention to any special construction of the several parts herein described, as the parts are the essential features of a corn-planter and are simply shown in forming a complete device, and therefore any changes or modifications thereof may be made without departing from the principle of the invention.

A rotatable grooved cam K has its journals $c$ in suitable boxes or bearings $d$, projecting from a platform L, and motion is imparted to this grooved cam by means of a sprocket-chain $d'$, engaging with the sprocket-wheels $e\ f$, or any other suitable and well-known means may be provided to give to the grooved cam the required rotary motion. The sprocket-wheel $e$ is fixed to one of the journals $c$ and the sprocket-wheel $f$ to the axle C. Thus the axle as it rotates will in like manner rotate the grooved cam through the medium of the sprocket chain and wheels.

A vibratory motion is imparted to the dropping-slide G by means of a vibratory lever M, which is provided with an antifriction-roller $g$ upon its inner or rear end to engage the groove in the cam K, as shown in Fig. 3 of the drawings. The lever M is formed with a sleeve $h$, which loosely fits over a pivot-pin $i$, projecting from a bracket N, which bracket is detachably connected to the platform L by means of clamping-screws $k$, or any other well-known and desirable means may be employed for this purpose.

By means of the above construction a pivotal connection is provided between the bracket and the lever whereby said lever is capable of a vibratory motion through the medium of the grooved cam.

The lever M, near its outer or front end, has a bearing-block $l$ of round or of any other shape found most effective in its action, said block being located between the flanges $m$ of a base-plate O of any suitable form and construction, which plate is secured in any preferred manner to the dropping-slide G. This block $l$ is adjustably connected to the lever M by a set-screw $n$ or by any other preferred means, the adjustability of the block upon the lever enabling the stroke to be increased or decreased, as required, thereby controlling the dropping of the corn from the hoppers.

The platform L is adjustable longitudinally by any means found best adapted to the purpose. One means, which I consider the most simple, is in providing a supporting-bar $o$, secured to the transverse brace $b$ and having an elongated opening or slot at its end, as shown in dotted lines of Figs. 3 and 4 of the drawings, and connecting the platform to the supporting-bar by means of a bolt $p$ and nut $q$. This will admit of the adjustability of the platform L to increase or diminish the distance between the sprocket-wheels, as circumstances require or for any other purpose desired.

The wheels D of the corn-planter are provided with suitable markers P of any preferred construction, said markers being connected to the rim of the wheel at points diametrically opposite each other, as shown in Figs. 2 and 7 of the drawings, thereby providing means for making a mark where the corn has been dropped without the necessity of previously marking off the ground to be planted. At the end of the row the planter is elevated by a suitable lifting-jack of any preferred construction, (not shown,) or any other suitable means may be used whereby the wheels may be turned so that one of the markers is parallel to the mark made on the previous or other row, after which the process of planting is proceeded with as before.

If desired, suitable scrapers Q may be employed to remove the dirt or mud adhering to the periphery of the wheels D, as shown in Fig. 1 of the drawings, the scrapers being of the usual construction.

The markers P are preferably connected to the wheels D by means of rods $r$, secured at their respective ends to the markers and to the hub of the wheel, as shown in Fig. 2 of the drawings, thereby preventing the markers from being broken off by coming in contact with obstructions.

An extensible brace-bar is provided to support the platform L and comprises the two sections R S, the section R being secured to the under side of the platform and the section S having a hooked end $s$ to engage the axle C of the corn-planter. The two sections R S are adjustably connected together by means of a bolt $t$, entering a slot $u$ in the section S, and a nut $v$, engaging the screw-threaded end of the bolt. Any other suitable and well-known means may be employed for rendering the brace-bar extensible, whereby it may be lengthened or shortened, as circumstances require.

The usual hand-lever T and foot-levers U V are simply shown to illustrate a complete corn-planter and have no relation whatever to my improved attachment. Consequently any further reference to or description thereof is considered unnecessary.

The corn-dropping attachment may be applied to any of the corn-planters in general use and is both simple and practical and also effective in its operation.

Having now fully described my invention, what I claim as new, and desire to secure by Letters Patent, is—

An attachment for corn-planters, comprising a removable and longitudinally-adjustable platform supported by an extensible brace-bar, a rotatable grooved cam supported on the platform, a bracket removably connected to the platform and having an upright pivot-pin, a lever provided with a sleeve fitting over the pin to form a pivotal connection between the lever and the bracket, an antifriction-roller upon the end of the lever adapted to engage with the groove in the cam, an adjustable bearing-block upon the opposite end of the lever, and a flanged base-plate connected to the dropping-slide of the planter and engaging the block upon the lever, substantially as and for the purpose set forth.

In testimony that I claim the above I have hereunto subscribed my name in the presence of two witnesses.

ROBERT D. ALLNUTT.

Witnesses:
  S. J. MILLER,
  ISAAC HIRSH.